US011295171B2

(12) United States Patent
Lee et al.

(10) Patent No.: US 11,295,171 B2
(45) Date of Patent: Apr. 5, 2022

(54) FRAMEWORK FOR TRAINING MACHINE-LEARNED MODELS ON EXTREMELY LARGE DATASETS

(71) Applicant: Google LLC, Mountain View, CA (US)

(72) Inventors: Joonseok Lee, Fremont, CA (US); Balakrishnan Varadarajan, Sunnyvale, CA (US); Ariel Gordon, Mountain View, CA (US); Apostol Ivanov Natsev, Sunnyvale, CA (US); Seong Jae Hwang, Pittsburgh, PA (US)

(73) Assignee: GOOGLE LLC, Mountain View, CA (US)

( * ) Notice: Subject to any disclaimer, the term of this patent is extended or adjusted under 35 U.S.C. 154(b) by 238 days.

(21) Appl. No.: 16/657,042

(22) Filed: Oct. 18, 2019

(65) Prior Publication Data

US 2021/0117728 A1    Apr. 22, 2021

(51) Int. Cl.
*G06K 9/62* (2006.01)
*G06N 20/00* (2019.01)
*G06K 9/00* (2022.01)
*G06K 1/00* (2006.01)

(52) U.S. Cl.
CPC ....... *G06K 9/6257* (2013.01); *G06K 9/00744* (2013.01); *G06K 9/6218* (2013.01); *G06N 20/00* (2019.01)

(58) Field of Classification Search
CPC combination set(s) only.
See application file for complete search history.

(56) References Cited

U.S. PATENT DOCUMENTS

| 2019/0147245 | A1* | 5/2019 | Qi ........................ G06K 9/3233 382/103 |
| 2019/0205761 | A1* | 7/2019 | Wu ...................... G06F 16/3344 |
| 2020/0074269 | A1* | 3/2020 | Trygg ..................... G06N 7/00 |
| 2020/0167943 | A1* | 5/2020 | Kim ........................ G06T 7/174 |
| 2020/0272888 | A1* | 8/2020 | Wang ................. G06K 9/00342 |

OTHER PUBLICATIONS

Aris-Kyriakos Koliopoulos,"A Parallel Distributed Weka Framework for Big Data Mining using Spark," Aug. 20, 2015, 2015 IEEE International Congress on Big Data ,pp. 9-13.*

(Continued)

*Primary Examiner* — Omar S Ismail
(74) *Attorney, Agent, or Firm* — Dority & Manning, P.A.

(57) ABSTRACT

A MapReduce-based training framework exploits both data parallelism and model parallelism to scale training of complex models. Particular model architectures facilitate and benefit from use of such training framework. As one example, a machine-learned model can include a shared feature extraction portion configured to receive and process a data input to produce an intermediate feature representation and a plurality of prediction heads that are configured to receive and process the intermediate feature representation to respectively produce a plurality of predictions. For example, the data input can be a video and the plurality of predictions can be a plurality of classifications for content of the video (e.g., relative to a plurality of classes).

18 Claims, 9 Drawing Sheets

(56) References Cited

OTHER PUBLICATIONS

Liangxiu Han, "Parallel data intensive applications using MapReduce: a data mining case study in biomedical sciences," Oct. 22, 2014, Cluster Comput (2015) 18:403-418 DOI 10.1007/s 10586-014-0405-9,pp. 404-410.*
Hanli Wang, "Large-Scale Multimedia Data Mining Using MapReduce Framework," Feb. 4, 2013, 2012 IEEE 4th International Conference on Cloud Computing Technology and Science, IEEE Computer Society, pp. 287-290.*
Sami Abu-El-Haija, "YouTube-8M: A Large-Scale Video Classification Benchmark," Sep. 27, 2016, Computer Vision and Pattern Recognition,https://arxiv.org/abs/1609.08675,pp. 1-8.*
Abu-El-Haija et al. "Youtube—8M: A Large-scale Video Classification Benchmark",arXiv:1609v1, Sep. 27, 2016, 10 pages.
Aliev et al, "Label Denoising with Large Ensembles of Heterogeneous Neural Networks", The $2^{nd}$ Workshop on YouTube—8M Large-Scale Video Understanding. Sep. 9, 2018, Munich, Germany, 12 pages.
Chen et al, "Aggregating Frame-level Features for Large-Scale video Classification", The $2^{nd}$ Workshop on YouTube—8M Large-Scale Video Understanding, Sep. 9, 2018, Munich, Germany, 6 pages.
Cho et al, "Large-Scale Video Classification with Feature Space Augmentation coupled with Learned Label Relations and Ensembling", 10 pages.
Chu et al., "Map-Reduce for Machine Learning on Multicore", Twenty-First Annual Conference on Neural Information Processing Systems, Dec. 3, 2007, Vancouver, Canada, 8 pages.
Dean et al, "Large Scale Distributed Deep Networks", Advances in Neural Information Processing Systems 25, Dec. 3-6, 2012, Lake Tahoe, Nevada, 9 pages.
Dean et al., "MapReduce: Simplified Data Processing on Large Clusters", Communications of the ACM, vol. 51, Issue 1, Jan. 2008, pp. 107-113.
Fernando et al., "Rank Pooling for Action Recognition", Pattern Analysis and Machine Intelligence, vol. 39, Issue 4, Apr. 2017, pp. 773-787.
Garg, "Learning Video Features for Multi-Label Classification", The $2^{nd}$ Workshop on YouTube—8M Large-Scale Video Understanding, Sep. 9, 2018. Munich, Germany, 13 pages.
Goyal et al, "Accurate. Large Minibatch SGD: Training ImageNet in 1 Hour", arXiv:1706v2, Apr. 30. 2018, 12 pages.
He et al, "Deep Residual Learning for Image Recognition", arXiv:1512v1, Dec. 10, 2015, 12 pages.
Hershey et al, "CNN Architectures for Large-Scale Audio Classification", arXiv:1609v2, Jan. 10, 2017, 5 pages.
Hochreiter et al, "Long Short-Term Memory", Neural Computation, vol. 9, Issue 8, Nov. 15, 1997, pp. 1735-1780.
Huang et al, "Densely Connected Convolutional Networks", 2017 IEEE Conference on Computer Vision and Pattern Recognition, Jul. 21-26, 2017, 9 pages.
Igel et al, "Empirical Evaluation of the Improved Rprop Learning Algorithms", Neural Computation, vol. 50, Jan. 2003, pp. 105-123.
Jordan et al, "Hierarchical Mixtures of Experts and the EM Algorithm", Neural Computation, No. 6, vol. 2, 6 pages.
Karpathy et al, "Large-Scale Video Classification with Convolution Neural Networks", Conference on Computer Vision and Pattern Recognition, 2014, 8 pages.
Kim et al, "Temporal Attention Mechanism with Conditional Inference for Large-Scale Multi-Label Video Classification", Proc. of the 2nd Workshop on YouTube—8M Large-Scale Video Understanding, 2018, 12 pages.
Kmiec et al, "Learnable Pooling Methods for Video Classification". 2nd Workshop on YouTube—8M Large-Scale Video Understanding, 2018, 11 pages.
Krishna et al, "Visual Genome: Connecting Language and Vision Using Crowdsourced Dense Image Annotations", International Journal of Computer Vision 123, 1, 2017, 44 pages.
Krizhevsky et al, "Imagenet Classification with Deep Convolutional Neural Networks", Advances in Neural Infonnation Processing Systems, 2012, 9 pages.
Laptev et al, "Learning Realistic Human Actions from Movies", Conference on Computer Vision and Pattern Recognition (CVPR), 2008, 8 pages.
Lee et al, "Collaborative Deep Metric Learning for Video Understanding", Conference on Knowledge Discovery and Data Mining, Aug. 19-23, 2018, London, United Kingdom, 10 pages.
Lee et al, "The 2nd YouTube—8M Large-Scale Video Understanding Challenge", Conference on Computer Vision, 13 pages.
Li et al, "Temporal Modeling Approaches for Lareescale Youtube—8M Video Understanding", arXiv:17071, Jul. 14, 2017, 5 pages.
Liang et al, "Deep Variation-Structured Reinforcement Learning for Visual Relationship and Attribute Detection", arXiv:1703v1, Mar. 8, 2017, 9 pages.
Lin et al, "NeXiVLAD: An Efficient Neural Network to Aggregate Frame-Level Features for Large-Scale Video Classification". arXiv:1811v1, Nov. 12, 2018, 13 pages.
Liu et al, "Distributed machine Learning: Foundations, Trends and Practices", International Conference on Worldwide Web Companion, 2017, pp. 913-915.
Miech et al, "Learnable Pooling with Context Gating for Video Classification", arXiv:1706v2, Mar. 5, 2018, 8 pages.
Pan et al, "Cyclades: Conflict-Free Asynchronous Machine Learning", Conference on Neural Information Processing Systems, 2016, Barcelona. Spain, 9 pages.
Qiu et al, "Learning Spatio-Temporal Representation with Pseudo-3d Residual Networks", arXiv:1711v1, Nov. 28, 2017, 9 pages.
Ren et al, "Faster R-CNN: Towards Real-Time Object Detection with Region Proposal Networks", arXiv:1506v3, Jan. 6, 2016, 14 pages.
Riedmiller et al, "A Direct Adaptive Method for Faster Backpropasation Learning: The RPROP Algorithm", International Conference on Neural Networks, 1993, 6 pages.
Smith et al, "Don't Decay the Learning Rate, Increase the Batch Size", arXiv:1711v2. Feb. 24, 2018, 11 pages.
Szegedy et al, "Inception—v4, Inception-ResNet and the Impact of Residual Connections on Learning", arXiv:1602v2, Aug. 23, 2016, 12 pages.
Szegedy et al, "Going Deeper with Convolutions", arXiv:1409v1, Sep. 17, 2014, 12 pages.
Tang et al, "Non-Local NetVLAD Encoding for Video Classification", arXiv:1810v1, Sep. 29, 2018, 10 pages.
Varol et al, "Long-Term Temporal Convolutions for Action Recognition", arXiv:1604v2, Jun. 2, 2017, 8 pages.
Wang et al, "Evaluation of Local Spatio-Temporal Features for Action Recognition", Workshop on YouTube—8M Large-Scale Video Understanding, 11 pages.
Wang et al, "The Monkeytyping Solution to the Youtube—8M Video Understanding Challenge", arXiv:1706v1, Jun. 16, 2017, 13 pages.
You et al, "Large Batch Training of Convolutional Networks". arXiv:1708v3, Sep. 13, 2017, 8 pages.
Yue-Hai Ng et al, "Beyond Short Snippets: Deep Networks for Video Classification", arXiv:1503v2, Apr. 13, 2015, 9 pages.
Zhang et al, "Asynchronous Distributed ADMM for Consensus Optimization", International Conference on Machine Learning, 2014, Beijing, China, 9 pages.
Zhang et al, "Deep Learning with Elastic Averaging SGD", International Conference on Learning Representations, May 7-9, 2015, San Diego, California, 21 pages.
Zhao et al, "Pyramid Scene Parsing Network", arXiv:1612v2, Apr. 27, 2017, 11 pages.
Zhou et al, "Places: A 10 Million Image Database for Scene Recognition", Pattern Analysis and Machine Intelligence, 2017, 14 pages.
Zhu et al, "UTS Submission to Google YouTube—8M Challenge", arXiv:1707v1, Jul. 13, 2017, 6 pages.
Zhu et al, "Visual7W: Grounded Question Answering in Images", arXiv:1511v4, Apr. 9, 2016, 10 pages.

* cited by examiner

FRAMEWORK FOR TRAINING MACHINE-LEARNED MODELS ON EXTREMELY LARGE DATASETS

FIELD

The present disclosure relates generally to a training framework for performing machine learning on extremely large datasets. More particularly, the present disclosure relates to MapReduce-based training framework that exploits both data parallelism and model parallelism to enable learning over an extremely large dataset.

BACKGROUND

In the last decade, a series of breakthroughs in machine learning and computer vision problems were attributed to the availability of large-scale quality datasets. As the quality and quantity of datasets increased, so did the sophistication of models and their ability to accomplish more complex, high-level tasks such as, as examples, scene understanding, pixel-level segmentation and depth extraction, Visual-Question-Answering, and other image or video understanding tasks.

However, for certain data modalities and/or learning scenarios the size and/or number of training examples that are available can raise significant challenges, including, for example, rendering the use of existing learning techniques computationally infeasible. For example, in certain scenarios a training dataset can contain one hundred million or more training examples. If each training example contains a moderate amount of data, it may be infeasible to simply apply standard learning techniques to learn from such a large volume of data. One example of such a data modality and scenario is attempting to learn from video data at the scale of the Internet (e.g., on the order of hundreds of millions of example videos).

More particularly, in the video classification domain, YouTube-8M is currently the largest public dataset, containing over 7 million videos with 4,716 classes. Classifying thousands of high-level video labels across diverse topics, ranging from objects to activities, requires multi-label classification models that can scale both in the number of classes and number of videos. With millions of video examples spanning hundreds of thousands of video hours, each epoch of training involves billions of frame-by-frame audio-visual features.

Thanks to modern GPUs and custom hardware accelerators, it is becoming less prohibitive to train machine learning models at this scale, including complex models, such as recurrent deep neural networks and frame-by-frame temporal aggregation networks.

Nevertheless, even the largest publicly available video datasets lag far behind the volume of public videos on the Internet. YouTube, for example, reached over 1 billion captioned videos in 2017. In addition, videos are growing at an unprecedented scale, with more than 500 hours of video being uploaded to YouTube each minute. Thus, training datasets which seek to approach the scale of Internet are on the order of 100M videos and tens of thousands of classes, or 1000 times larger than most public datasets. Not only is the volume of online videos large, but so is the variety of topics covered by those videos. Annotating videos at that scale and diversity requires the support of much larger vocabularies than those found in public datasets.

Thus, while the field of video understanding has made great strides in the past several years due to the availability of large-scale video datasets and core advances in image, audio, and video modeling architectures, the state-of-the-art architectures on smaller scale datasets are frequently impractical to deploy at Internet scale, both in terms of the ability to train such deep networks on hundreds of millions of videos, and to deploy them for inference on billions of videos. Therefore, new techniques for handling extremely large datasets are needed in the art.

Furthermore, while video data is used throughout the present disclosure as an example scenario in which a massive number of training examples are available (and each training example contains a substantial amount of data), other domains of data also fit this profile, including audio data, image data, genomic data, protein data, pharmaceutical data, chemical data, medical imagery, and many others. The techniques described herein are applicable to any scenario in which a training dataset is extremely large due, for example, to the number of training examples contained therein and/or the amount of data contained in each training example.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method to perform machine learning. The method includes obtaining, by a computing system includes one or more computing devices, data descriptive of a machine-learned model that includes a shared feature extraction portion configured to receive and process a data input to produce an intermediate feature representation and a plurality of prediction heads that are configured to receive and process the intermediate feature representation to respectively produce a plurality of predictions. The method includes performing, by the computing system, one or more training iterations to train the machine-learned model on a training dataset that includes a plurality of training examples. Each training iteration includes a first training stage and a second training stage. The first training stage includes separately training the plurality of prediction heads in parallel on at least a portion of the training dataset. The second training stage includes separately determining a plurality of updates to the shared feature extraction portion in parallel using a plurality of different batches from the training dataset.

Another example aspect of the present disclosure is directed to a computing system that includes one or more processors and one or more non-transitory computer-readable media. The one or more non-transitory computer-readable media collectively store a machine-learned video annotation model that includes a feature extraction portion configured to receive and process one or more video frames of an input video to generate an intermediate feature representation and a plurality of classification heads configured to receive and process the intermediate feature representation to generate a plurality of classifications for the one or more video frames relative to a plurality of classes. One or both of the feature extraction portion and the plurality of classification heads has been trained using one or more MapReduce operations. The one or more non-transitory computer-readable media collectively store instructions that, when executed by the one or more processors, cause the computing system to perform operations. The operations include providing the one or more video frames of the input video as an input the machine-learned video annotation model.

The operations include receiving the plurality of classifications for the one or more video frames as an output of the machine-learned video annotation model.

Another example aspect of the present disclosure is directed to one or more non-transitory computer-readable media that collectively store instructions that, when executed by one or more processors, cause the one or more processors to perform operations. The operations include obtaining a set of training data that includes a plurality of training examples. The operations include obtaining a machine-learned model that includes a shared feature extraction portion and a plurality of prediction heads. The operations include performing a plurality of training iterations. Performing the plurality of training iterations includes alternating between a first training stage and a second training stage. The first training stage includes separately training the plurality of prediction heads in parallel on the set of training data. The second training stage includes separately determining a plurality of updates to the shared feature extraction portion in parallel using a plurality of different batches from the training dataset.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1:
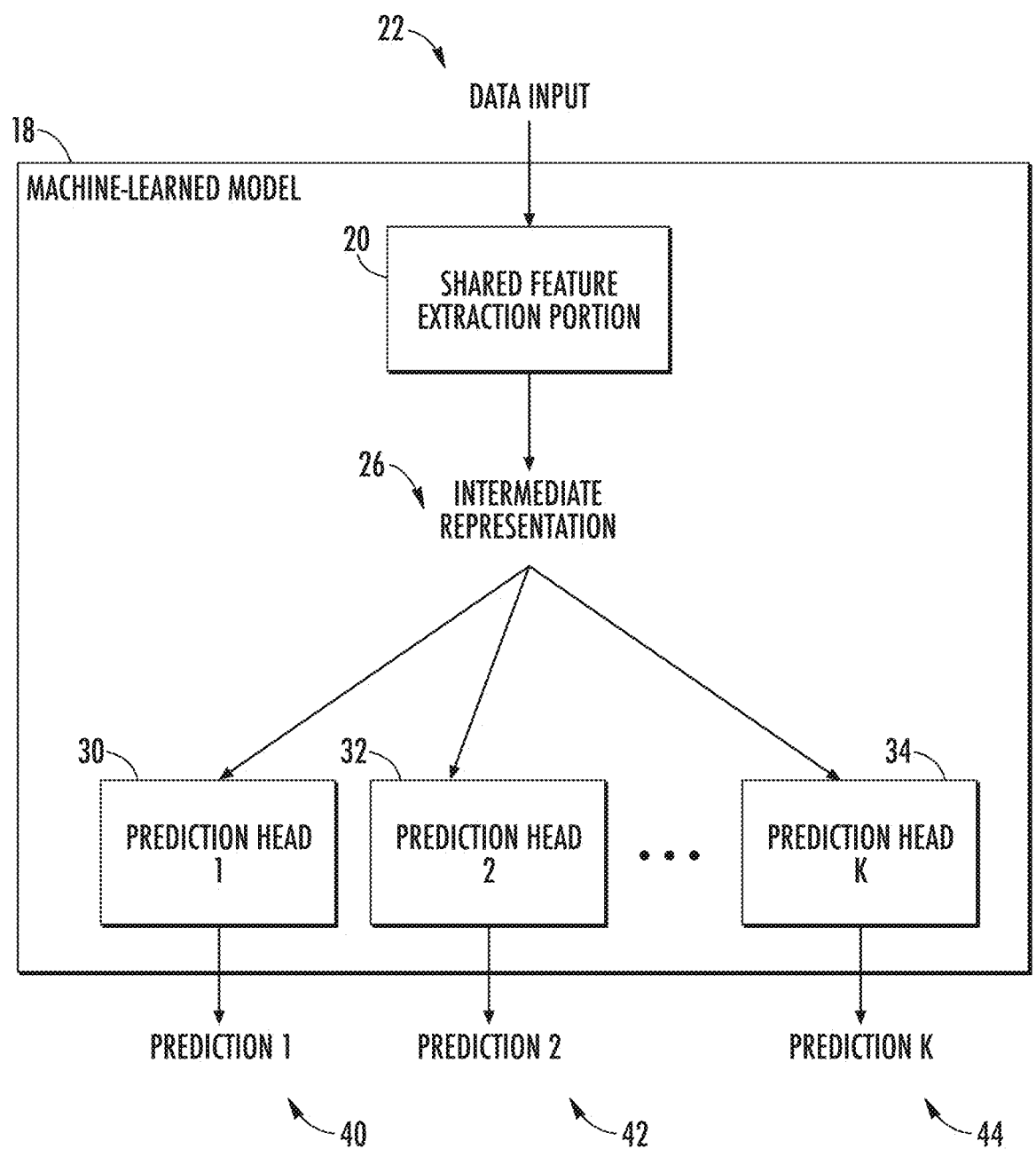
FIG. 1 depicts a block diagram of an example machine-learned model architecture according to example embodiments of the present disclosure.

Reference numerals that are repeated across plural figures are intended to identify the same features in various implementations.

DETAILED DESCRIPTION

Overview

Generally, the present disclosure is directed to a MapReduce-based training framework which exploits both data parallelism and model parallelism to scale training of complex models. Aspects of the present disclosure are also directed to particular model architectures which facilitate and benefit from use of such training framework. As one example, a machine-learned model can include a shared feature extraction portion configured to receive and process a data input to produce an intermediate feature representation and a plurality of prediction heads that are configured to receive and process the intermediate feature representation to respectively produce a plurality of predictions. For example, the data input can be a video and the plurality of predictions can be a plurality of classifications for content of the video (e.g., relative to a plurality of classes).

The proposed training framework can alternate between optimization of the shared feature extraction portion with data parallelism and optimization of the prediction heads with model parallelism. Specifically, a computing system can perform one or more training iterations to train the machine-learned model on a training dataset that comprises a plurality of training examples. Each training iteration comprises a first training stage and a second training stage, where the first training stage includes separately training the plurality of prediction heads in parallel on the set of training data and the second training stage includes separately determining a plurality of updates to the shared feature extraction portion in parallel using a plurality of different batches from the training dataset. Furthermore, the parallel computation aspects of each of the first and the second training stages can be accomplished using MapReduce techniques.

The use of data and model parallelism in this fashion can support large Mixture-of-Experts classifiers with hundreds of thousands of mixtures. The proposed techniques also enable a trade-off between model depth and breadth and provide the ability to shift model capacity between shared (generalization) layers and per-class (specialization) layers. Example implementations of the proposed framework were able to reach state-of-the-art performance on the largest public video datasets, YouTube-8M and Sports-1M, and can scale to 100 times larger datasets.

More particularly, the present disclosure provides techniques that enable training of machine-learned models on extremely large datasets with a proposed MapReduce-based distributed framework. One example scenario in which the proposed techniques have been proven beneficial is the video annotation problem at scale. The proposed techniques enable an example video classification model to scale to hundreds of millions of videos with hundreds of thousands of classes or classifier mixtures.

While video data is used throughout the present disclosure as an example scenario in which a massive number of training examples are available (and each training example contains a substantial amount of data), other domains of data also fit this profile, including audio data, image data, genomic data, protein data, pharmaceutical data, chemical data, medical imagery, and many others. The techniques described herein are applicable to any scenario in which a training dataset is extremely large due, for example, to the number of training examples contained therein and/or the amount of data contained in each training example. Thus, the architectures and frameworks described herein are applicable to any problem/domain in which a large number of prediction heads (e.g., classifiers, annotators, and/or "experts") are desired and/or a large training dataset is available.

Aspects of the present disclosure address both prediction quality and scalability at the same time: building a framework that can support training complex machine-learned models at web scale. Although it is known that MapReduce is an effective tool for distributed computation at scale, the proposed framework is the first-in-kind application of MapReduce to the problem of large-scale model training, supporting both shared (deep) representation learning and specialized per-class (large) mixture modeling.

According to another aspect, the present disclosure provides model architectures which enable application of the MapReduce-based techniques described herein. As one example, a machine-learned model can have a shared feature extraction portion that generates an intermediate feature representation and a plurality of prediction heads that respectively generate a plurality of predictions based on the intermediate feature representation. The shared feature extraction portion can be trained while taking advantage of data parallelism. Specifically, a plurality of workers can respectively determine a plurality of updates to the shared feature extraction portion based on a plurality of different batches of the training data. Conversely, the plurality of prediction heads can be trained while taking advantage of model parallelism. Specifically, a plurality of workers can separately train the plurality of prediction heads in parallel on the same or different portions of the set of training data.

One example implementation of the above-described model architecture that is described in detail elsewhere herein is a scalable variant of the Deep-Bag-of-Frames (DBoF) model with mixture-of-experts (MoE), one of the top-performing video classification models on YouTube-8M. In some implementations, the model architecture can further apply Self-Weighted Average Pooling (SWAP) approach for temporal pooling of frame-level representations.

The systems and methods of the present disclosure provide a number of technical effects and benefits. As one example, aspects of the present disclosure enable using an extremely large number of prediction heads (e.g., an extremely large number of experts in a MoE scheme). By increasing the number of prediction heads (e.g., classifiers) that can be used, the breadth of possible predictions can be increased, thereby providing additional opportunities for alternative or insightful predictions. As an example, considering the wide range of video topics on the web, it is essential to train a model capable of classifying multiple labels. When the number of possible classes is large, it is generally desirable to increase the number of experts. Without a scalable training framework, however, increasing the number of experts becomes impractical due to computational overhead. For this reason, most previous works have used a small number of (i.e., <5) experts. However, this small number of experts can be sub-optimal, depending on the problem and data diversity. To resolve these issues, the proposed framework provides model parallelism to allow training large MoEs, with hundreds of thousands of mixtures (across all classes), on hundreds of millions of videos.

Another benefit of the present disclosure is that it enables large-scale optimization. In general, utilizing a larger mini-batch often equates to a superior performance. At modern large-scale datasets, however, considering even 1% batch size (for example, 80K examples in YouTube-8M) becomes infeasible in ordinary settings. Via data parallelism, the proposed framework allows large-batch optimization such as, for example, via Resilient Backpropagation (RProp). When the batch size is sufficiently large (e.g., 50%), this traditional approach becomes worth revisiting for its known robustness involving only few parameters. Large-scale learning over a very large training dataset results in improved model performance. In fact, example implementations of the techniques described herein have shown state-of-the art performance in video classification tasks (e.g., YouTube-8M and Sports-1M datasets). These example experimental results are contained in Hwang and Lee et al., *Large-Scale Training Framework for Video Annotation*, KDD '19 (2019).

By leveraging both data parallelism and model parallelism, the proposed framework provides an improved allocation of computing tasks (e.g., learning operations) among various devices in a distributed computing system, thereby reducing consumption of computing resources such as processor usage, memory usage, network bandwidth etc. Stated differently, compared to application of existing learning techniques to the same large-scale dataset, the proposed framework enables much faster training and improved results.

Thus, the present disclosure provides a MapReduce-based training framework, designed to train state-of-the-art models (e.g., video annotation models) at large scale. The present disclosure also provides algorithmic optimization schemes which were not practical previously. As one example, large mixture-of-experts and full-batch fine-tuning (which was not previously practical) can be used to improve a converged model after traditional training to achieve state-of-the-art performance (e.g., on YouTube-8M and Sports-1M datasets). The proposed framework and model are highly scalable (e.g., to enable training on 500M videos with over 16K classes).

With reference now to the Figures, example embodiments of the present disclosure will be discussed in further detail.

Example Problem Space and Models

Example Model Architecture

FIG. 1 depicts a block diagram of an example machine-learned model 18 according to example embodiments of the present disclosure. The machine-learned model 18 includes a shared feature extraction portion 20 and a plurality of prediction heads, illustrated in FIG. 1 as prediction heads 30, 32, and 34. Any number of prediction heads can be included in the model 18. As an example, the number of prediction heads can be 10s of prediction heads, 100s of prediction heads, 1000s of prediction heads, etc. Aspects of the present disclosure enable using an extremely large number of prediction heads.

The shared feature extraction portion 20 can receive and process a data input 22 to produce an intermediate representation 26. The data input 22 can be any form of data including audio data, text data, image data, biological data, pharmaceutical data, genomic data, protein data, chemical data, etc. The shared feature extraction portion 20 can be various forms of machine-learned models including, as an example, a multi-layer neural network.

In some instances, the intermediate representation 26 can be a latent representation. In some instances, the intermediate representation 26 can be an embedding. In some instances, the intermediate representation 26 can be a expressed as a continuous vector.

Each prediction head (e.g., 30, 32, 34) can receive and process the intermediate representation 26 to produce a respective prediction (e.g., head 30 has made prediction 40, head 32 has made prediction 42, head 34 has made prediction 44). In some implementations, each prediction head (e.g., 30, 32, 34) can be a classifier such that each prediction (e.g., 40, 42, 44) is a classification of the data input 22 relative to one or more respective class(es). In some implementations, each prediction head (e.g., 30, 32, 34) can be a binary classifier that classifies the data input 22 relative to a single class. The respective class(es) among the prediction heads (e.g., 30, 32, 34) can be overlapping or non-overlapping. In other implementations, each prediction head (e.g., 30, 32, 34) performs a class other than classification.

Example Video Annotation Problem

While the systems and methods described herein are broadly applicable to many different data modalities, one example problem that demonstrates the benefits of the proposed approach is the video annotation problem. In particular, given a video of T frames with D dimensional preprocessed frame-level features $X \in \mathbb{R}^{D \times T}$, the goal of the video annotation problem is to predict each of its video-level label $y \in \{0,1\}^K$ describing the video content (e.g., gaming, sports), where K is the number of possible labels. When a finite number of labels are possible, this problem can be modeled as a multi-label classification problem. Therefore, henceforth the present disclosure uses video classification and video annotation interchangeably. Naturally, both sequential models (e.g., RNN) and frame-pooling models (e.g., bag-of-frames) become appropriate for this problem.

Example Video Annotation Model

Figure 2:
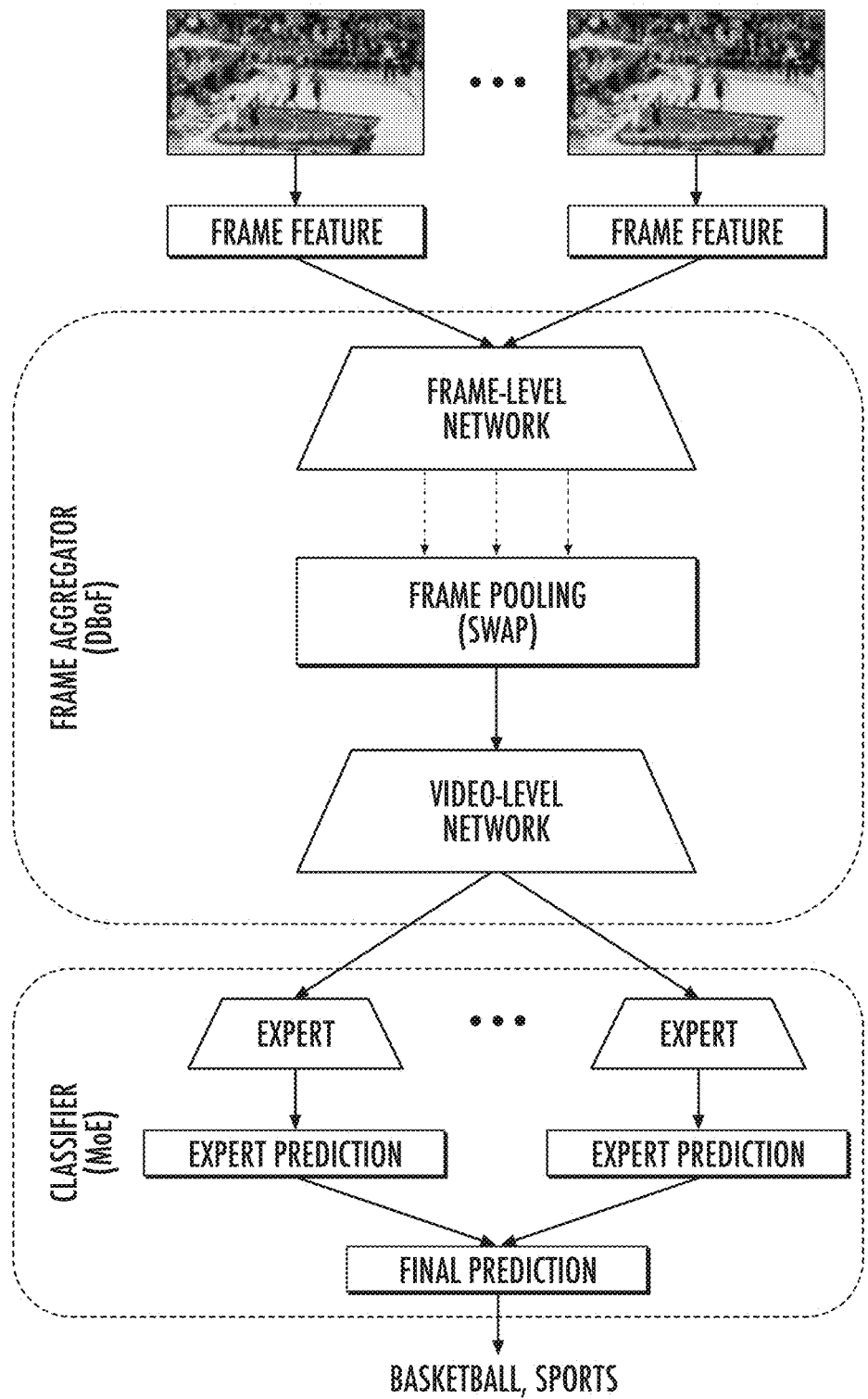
FIG. 2 depicts a block diagram of an example machine-learned video annotation model according to example embodiments of the present disclosure.
Figures 3A, 3B, 3C:
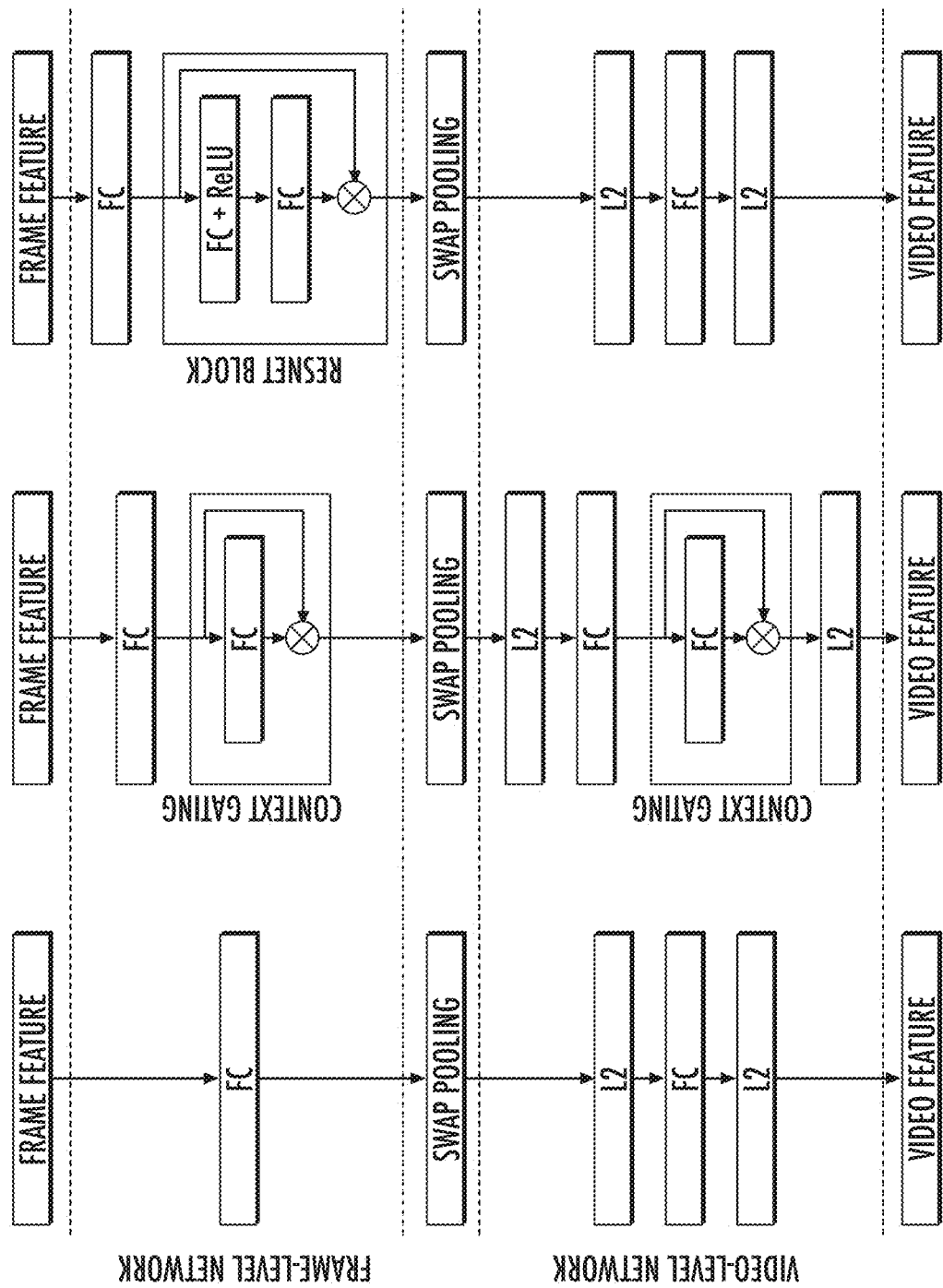
FIGS. 3A-C depict block diagrams of example deep bag of frame architectures according to example embodiments of the present disclosure.

FIG. 2 depicts a block diagram of an example machine-learned video annotation model according to example embodiments of the present disclosure. The model illustrated in FIG. 2 includes the following two components: 1) Deep-Bag-of-Frames (DBoF) for aggregating the frame-level features into a video-level feature, and 2) Mixture-of-Experts (MoE) for constructing multiple 'expert' binary classifiers for each class. FIGS. 3A-C depict block diagrams of example DBoF architectures according to example embodiments of the present disclosure. In particular, FIG. 3A shows a DBoF-Basic architecture; FIG. 3B shows a DBoF-Cgate architecture; and FIG. 3C shows a DBoF-ResNet architecture.

Example Frame Aggregators

Referring collectively to FIGS. 2 and 3A-C, bag-of-words type models have been shown to be promising for sequential data such as videos. Analogously treating a set of frame-level features as a "bag-of-frames", the example model shown in FIG. 2 represents a revision of Deep-Bag-of-Frames (DBoF) models. One example architecture of DBoF (e.g., as illustrated in FIG. 2) can be as follows:

1. Frame-level Network: Given a video and its frame-level features (visual and/or audio) $X \in \mathbb{R}^{D \times T}$ as stated above, a frame-level network transforms each frame-level feature $x_j \in \mathbb{R}^D$ of frame j into its new representation, typically to a higher dimensional space. In some implementations, as illustrated in FIGS. 3A-C, the frame-level network can include one or more of the three following networks: (i) fully-connected layer, (ii) fully-connected layer with context gating, and (iii) fully-connected layer with a residual block.

2. Frame Pooling: Then, the embedded representations of the given video are aggregated to a single video-level feature through a frame pooling layer. Specifically, some example implementations of the present disclosure (e.g., as illustrated in FIGS. 2 and 3A-C) use a Self-Weighted Average Pooling (SWAP) operation for each video which normalizes the pooling frames $x_j \in \mathbb{R}^D$ for j=1, . . . , T as follows:

$$v = \sum_{j=1}^{T} \frac{|x_j|}{\sum_{j'=1}^{T} |x_{j'}|} x_j. \tag{1}$$

In other words, the new video-level pooled feature v is the sum of the frame-level features $x_j$ weighted by their corresponding activations and normalized over time. Other pooling methods (e.g., average, max, or $L_2$ pooling) can optionally be used instead.

3. Video-level Network: The aggregated pooled feature v goes through another network, embedding the final video-level feature. In some implementations, (e.g., as shown in FIG. 3B) the video-level network can include context gating.

While FIGS. 2 and 3A-C provide example implementations of the DBoF model, the DBoF can be generalized with various networks and pooling methods.

Example Mixture-of-Experts Classifier

Referring still to FIG. 2, once the video-level feature v is derived, K one-vs-all binary classifiers can be trained to estimate the probability $p(y_k|v)$ of each label $y_k$ (for k=1, . . . , K) describing the video v. For each one-vs-all classifier, a Mixture-of-Experts (MoE) model can be used which summarizes the 'opinions' $p(y_k|v,e)$ from a set of 'experts' $e \in \varepsilon_y$ weighted by $p(e|v)$:

$$p(y_k|v) = \sum_{e \in \varepsilon_y} p(e|v)p(y_k|v, e). \tag{2}$$

As one particular example, a binary logistic regression classifier can be used $$p(y_k|v,e) = \sigma(w_e^T v) \tag{3}$$

for each expert and let p(e|v) be a softmax over $|\varepsilon_k|+1$ experts with a dummy state for the non-existence of the label $y_k$.

Similar to DBoF, the choice of classifier is not strictly limited to MoE. MoE has the following benefits: 1) it has been shown to be a powerful classifier among many successful video annotation models, and 2) it can fully take advantage of the proposed framework (e.g., as described in the next section), significantly improving the overall performance at scale.

Example Training Framework

This section first describes the proposed distributed training framework based on MapReduce, which enables parallelism in both model and data. Next, it is shown how the proposed framework applies to example implementations of the DBoF model to perform scalable operations for the large-scale video annotation task.

Example Alternating Large-Scale Training

A naive implementation of the models shown in FIGS. 1 and 2 is not scalable. As the number of model parameters in the prediction heads in FIG. 1 or experts shown in FIG. 2 grows with the number of prediction heads/experts, back-propagating gradients from the prediction heads/experts to the shared feature extraction portion (e.g., the video-level network) represents a computational bottleneck.

However, in many cases it is desirable to have a large vocabulary set as well as a large number of experts per classifier, especially for large-scale data to flexibly cover a variety of topics.

In order to alleviate this bottleneck, the present disclosure provides an alternating update scheme between the prediction heads (e.g., the classifier experts) and the shared feature extraction portion (e.g., the frame aggregator) which updates one while fixing the other. Then, each part can be efficiently updated via model and data parallelism. In some implementations training framework contains three stages:

Pre-training stage: Joint Training. In some implementations, the training process can include a pre-training stage. In the pre-training stage, the shared feature extraction portion (e.g., frame aggregator) one or more prediction heads (e.g., MoE classifier) can be jointly trained. In some implementations, a smaller alternative set of prediction heads (e.g., a small MoE such as ≤5 experts) can be used instead of the full set of prediction heads to speed up the initial pre-training. The alternative set of prediction heads can be a subset of the full set of prediction heads or can include different prediction heads than the full set of prediction heads. The pre-training can include optimization via a mini-batch stochastic method (e.g., ADAM) to prevent early overfitting. This is a "warm-start" stage where the performance is solely based on the model itself without distributed computation. After the model converges, proceed to Stage 1.

Stage 1: Prediction Head Training. At this step, the shared feature extraction portion (e.g., frame aggregator) is fixed and not updated. The smaller set of prediction heads from the pre-training stage is replaced with a newly initialized large set of prediction heads (e.g., large MoE). Each prediction head is trained in parallel via model parallelism.

Figure 4A:
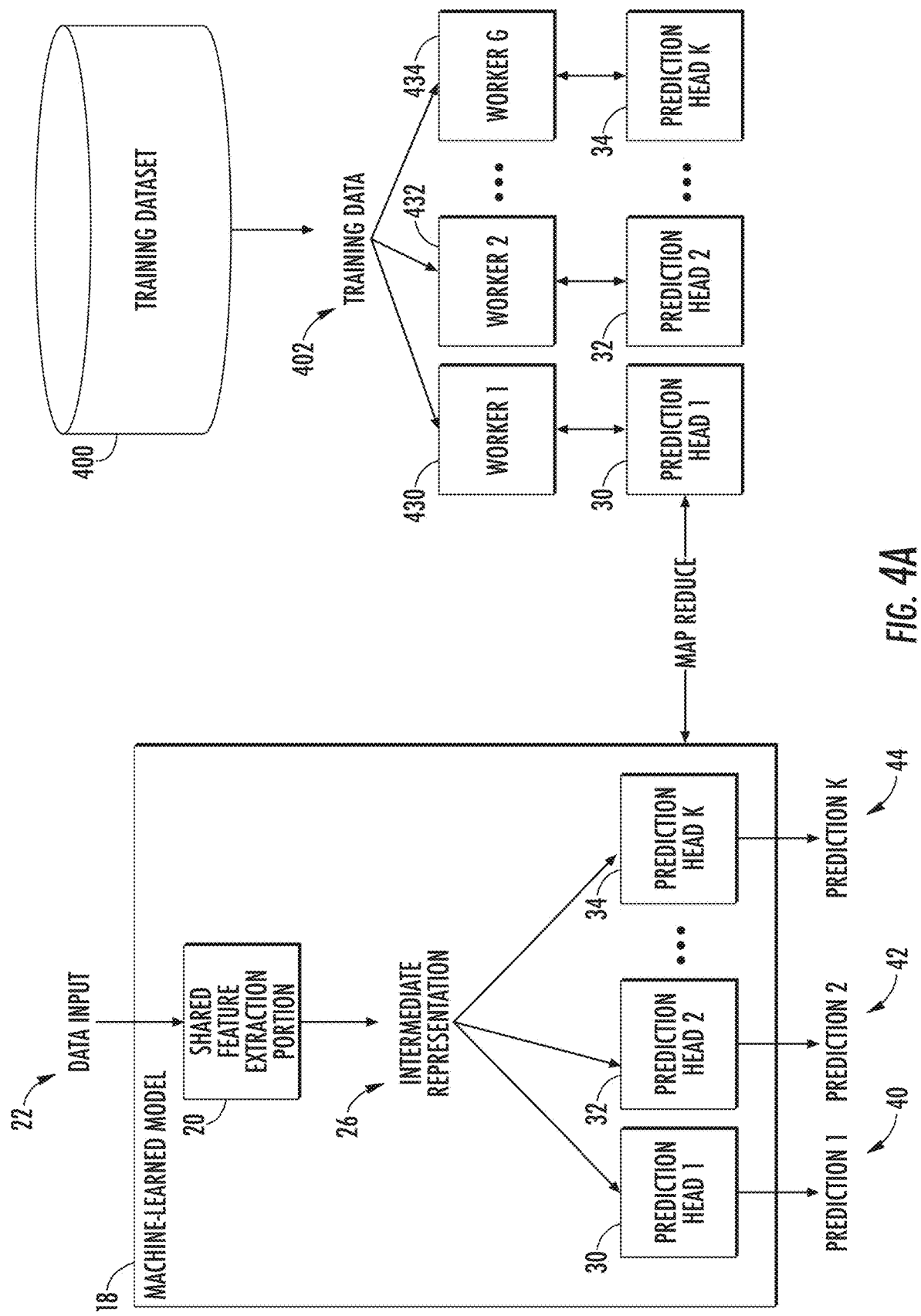
FIGS. 4A and 4B depict block diagrams of example training stages according to example embodiments of the present disclosure.

FIG. 4A provides an example illustration of Stage 1 of the training process. As illustrated in FIG. 4A, the prediction heads 30, 32, 34 are respectively mapped to workers 430, 432, 434. The number of workers G may equal the number of heads K (e.g., one worker per head) or the number of workers G may not equal the number of heads K (e.g., at least one worker trains multiple heads). Each worker 430, 432, 434 can train its respective head 30, 32, 34 on a set of training data 402 obtained from the training dataset 400. The set of training data 402 can be same for each worker/head (as illustrated) or different batches of training data from the dataset 400 can be used by different workers/heads. The updated prediction heads 30, 32, 34 are reduced back to the model 18. Upon convergence, proceed to Stage 2.

Stage 2: Shared Feature Extraction Portion Fine-tuning. At this stage, the prediction heads (e.g., MoE) are fixed and the shared feature extraction portion (e.g., frame aggregator) is fine-tuned via data parallelism. One example learning algorithm that can be used at this stage is iRProp$^+$. Typically, the prediction heads are not fine-tuned, although possible, as the benefit is less substantial.

Figure 4B:
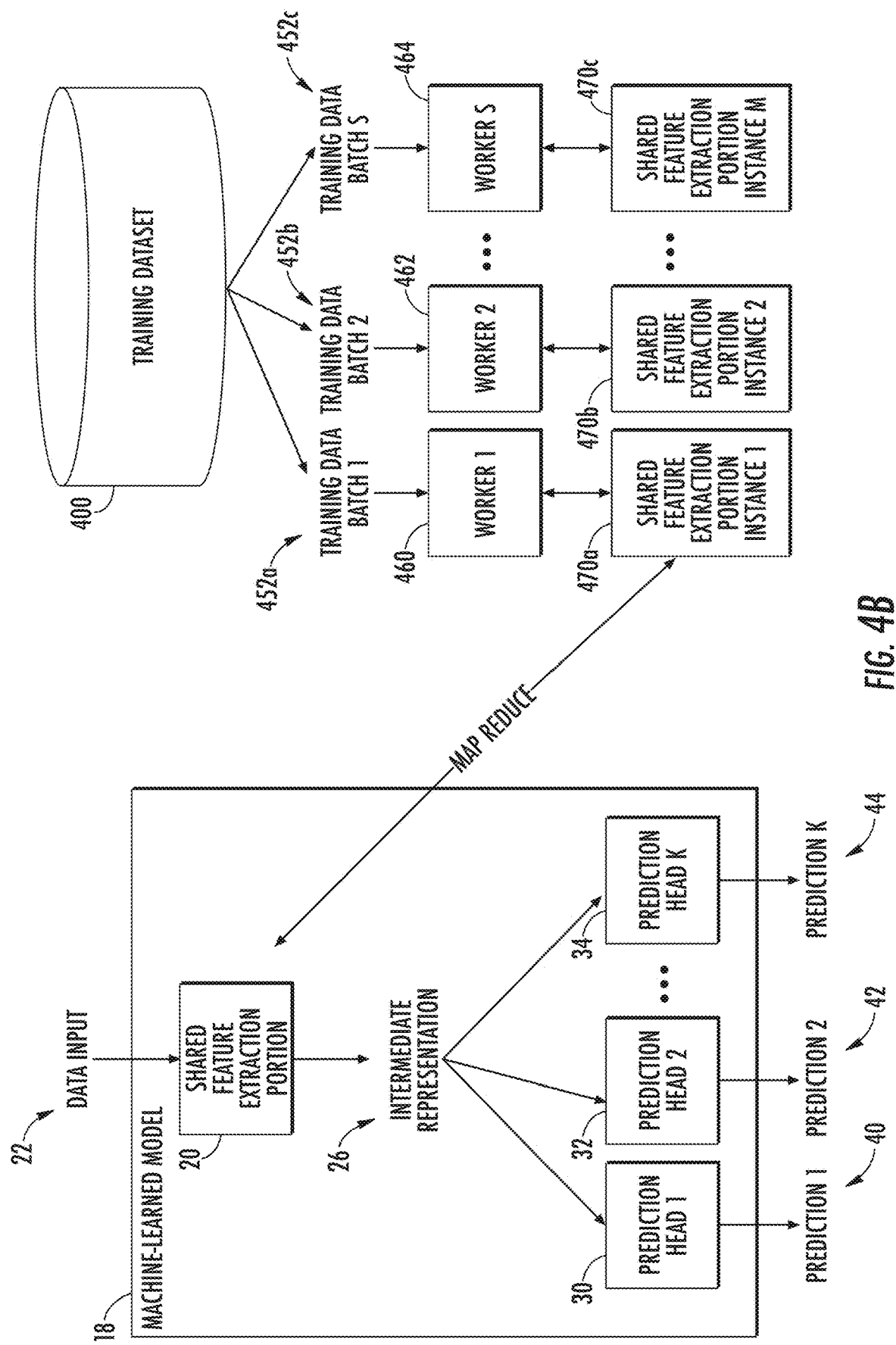

FIG. 4B provides an example illustration of Stage 2 of the training process. As illustrated in FIG. 4B, multiple instances 470a, 470b, and 470c of the shared feature extraction portion 20 are respectively mapped to workers 460, 462, and 464. The number of workers S may equal the number of instances M (e.g., one worker per instance) or the number of workers S may not equal the number of instances M (e.g., at least one worker trains multiple instances). Each worker 460, 462, 464 can train its respective instance 470a, 470b, 470c of the shared feature extraction portion 20 on a different batch of training data obtained from the training dataset 400. For example, worker 460 trains instance 470a on training data batch 452a while worker 462 trains instance 470b on training data batch 452b. Each training data batch (e.g., 452a, 452b, 452c) can include a unique combination of training examples from the training dataset 400. In some implementations, the training data batches (e.g., 452a, 452b, 452c) are overlapping while in other instances the training data batches (e.g., 452a, 452b, 452c) are non-overlapping.

The respective updates to the instances 470a-c of the shared feature extraction portion 20 are reduced back to the model 18. For example, the updates can be aggregated (e.g., averaged). Once converged, the process returns to Stage 1.

Stages 1 and 2 can be repeated until convergence. Both the Pre-Training Stage and Stage 2 ensure convergence, and Stage 1 also converges quickly despite the retraining of the prediction heads because each prediction head is relatively simple to train (e.g., each head may be a very simple classifier (essentially a perceptron)). In example experiments, small to no loss of performance was observed after several epochs, and it was observed that retraining the MoE repeatedly after each alternation is actually more beneficial than continuously training the MoE.

Thus, the proposed training framework leverages MapReduce operations to perform efficient training on an extremely large dataset. The Map step distributes the pieces to multiple workers which run in parallel. Then, once their jobs are complete, the Reduce step aggregates the results to proceed with the next global operation. This "divide-and-conquer" approach scales well given a sufficient number of available workers. The proposed framework effectively utilizes MapReduce to perform Steps 1 and 2 efficiently by leveraging the following principles:

1. Model Parallelism: As the shared feature extraction portion is fixed in Stage 1, only the prediction heads become trainable. This allows the prediction heads to be trained in parallel which in effect allows larger sets of prediction heads (e.g., MoE) to be trainable. Specifically, the framework Maps the partitioned heads (e.g., partitioned based on independence/dependence relative to the training data) to the workers, updates their parameters in parallel, and then Reduces them back to a single model. Given well trained feature extraction portions, this scheme allows the number of prediction heads to scale to the tens of thousands.

2. Data Parallelism: In machine learning, samples are often assumed to be independent and identically distributed (i.i.d.), and gradients are computed within a mini-batch of randomly chosen hundreds of samples, assuming they can reasonably represent the entire dataset. With billions of examples, however, it becomes harder to represent the entire dataset unless the mini-batch size can be significantly increased, which is also prohibitive. The proposed framework allows the gradient computation in parallel (Map) from a larger pool of independent examples and aggregates it (Reduce) with a large batch size. In some implementations, even the full-batch gradient computation with billions of examples can be performed.

Given the scalable framework, this section next describes example algorithmic aspects of the example models and training parallelism described above.

Example Large Mixture-of-Experts

Compared to global classifiers that classify all classes with equally structured classifier models, one key advantage of using a set of local classifiers such as MoE is its ability to flexibly train based on unique characteristics of the class. Consequently, having more experts becomes especially useful as the number of classes gets larger and as those classes cover a wide variety of topics.

It is not trivial, however, to increase the number of experts with a large-scale dataset. With respect to the DBoF framework, given K possible labels, constructing a DBoF model with MoE of $|\varepsilon|$ binary classifier experts for each label requires $K|\varepsilon|$ experts in total. This quickly becomes problematic with a large-scale dataset having thousands of labels (i.e., K=4,716 for YouTube-8M) with a moderate intermediate representation size (e.g., 2,048) resulting in a MoE with approximately 10M×|ε| variables to train.

Fortunately, the weights $w_e$ in Eq. (3) of each and every expert $e \in \varepsilon_k$ for all k=1, . . . , K labels can be trained independently from each other. Thus, as one example, the K classes can be partitioned into M workers to train the experts corresponding to the classes, drastically reducing the training time proportional to the number of available workers in $O(|\varepsilon|K/M)$ in the case where, for example, the classes are evenly distributed to the workers.

Example Adaptive Mixture-of-Experts

In some implementations, the classes with a different number of positive examples can be served by a different number of experts. That is, labels with a small number of examples require fewer experts to avoid overfitting or to reduce unnecessary experts. To alleviate this, for each label $y_k$ the maximum number of experts can be bounded to be $|\varepsilon_{max}|$. The adjusted number of experts $|\varepsilon_k|$ can be determined based on the number of positive examples in the dataset as follows:

$$|\varepsilon_k| = \min\left\{\frac{\sum_{i=1}^{N} 1[y_k^{(i)} = 1]}{q}, |\varepsilon_{max}|\right\} \quad (4)$$

where the summation in the numerator is the number of samples with the k'th label $y_k$ and q>0 is a constant scaling the number of experts to that sum. Thus, increasing q enforces the classes with small number of examples to have fewer experts. This adaptive scheme controls the balance between the number of examples per class and its number of experts.

Example Full-Batch Fine-Tuning

Previous works have acknowledged the value of large batch training for faster convergence but could not further increase the mini-batch size (i.e., 32K) under practical limitations. Given the efficient data parallelism with the proposed scalable framework, however, the large batch optimization can be strategically applied as follows.

First, the model can be trained with a standard mini-batch solver (e.g., the Pre-Training Stage described above) to obtain fast initial training while minimizing early overfitting which is more detrimental. This is a safe and secure approach as demonstrated by other DBoF models.

Upon convergence, the model becomes sensitive to further updates, so robustness is the key for performing effective fine-tuning. Thus, the model can be further fine-tuned with a robust full-batch optimization such as, for example, the Improved Resilient Backpropagation (RProp) called iRProp⁺. This traditional full-batch optimization method can be used for its robustness with very few parameters and performance competitive to even second-order methods. Briefly, in some examples, the full-batch gradient is computed by summing over the gradient with respect to every training example in the entire training dataset. Then, depending on the gradient direction compared to the previous iteration, the learning rate of each weight changes.

The proposed framework allows an efficient full-batch gradient computation via MapReduce, described in Algorithm 1 presented below. Given the current weights w, the gradient $[\partial E/\partial w]_{x=x^{(i)}}$ can be computed for each training example $x_i$ across the entire full-batch in parallel in the Map step. Then, following the RProp gradient computation scheme, those distributed gradients can be collected in the Reduce step and summed to compute the full-batch gradient g. The proceeding update step follows iRProp⁺, but note that any optimization scheme which could benefit from full-batch gradients (e.g., full-batch SGD) may integrate to this framework. For N examples with |w| weights and M workers, the framework can compute the gradient in O(|w|N/M) once similar number of examples are assigned to each worker.

Example Devices and Systems

Figure 5A:
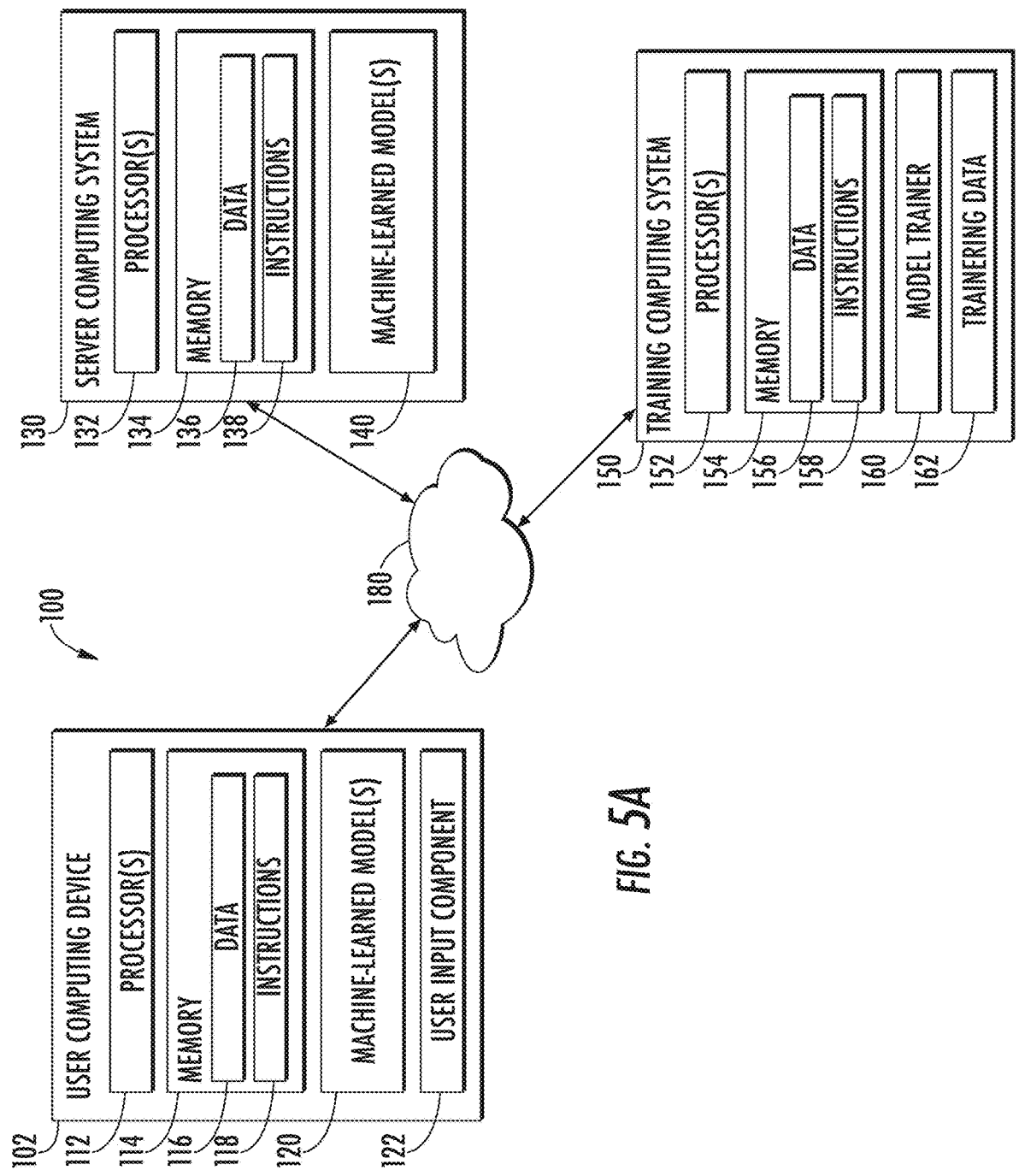
FIG. 5A depicts a block diagram of an example computing system according to example embodiments of the present disclosure.

FIG. 5A depicts a block diagram of an example computing system 100 according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more machine-learned models 120. For example, the machine-learned models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Example machine-learned models 120 are discussed with reference to FIGS. 1-4B.

In some implementations, the one or more machine-learned models 120 can be received from the server computing system 130 over network 180, stored in the user computing device memory 114, and then used or otherwise implemented by the one or more processors 112. In some implementations, the user computing device 102 can implement multiple parallel instances of a single machine-learned model 120 (e.g., to perform parallel video annotation across multiple instances of videos).

Additionally or alternatively, one or more machine-learned models 140 can be included in or otherwise stored and implemented by the server computing system 130 that communicates with the user computing device 102 according to a client-server relationship. For example, the machine-learned models 140 can be implemented by the server computing system 140 as a portion of a web service (e.g., a video annotation service). Thus, one or more models 120 can be stored and implemented at the user computing device 102 and/or one or more models 140 can be stored and implemented at the server computing system 130.

The user computing device 102 can also include one or more user input component 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Example models 140 are discussed with reference to FIGS. 1-4B.

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include or be in communication with one or more worker computing devices (referred to herein as "workers"). Each worker can be a computing device of some kind, including, as examples, smartphones, laptop computers, personal computers, server computing devices, embedded computing devices, and/or various other kinds of computing devices. In some implementations, the workers can be virtual machines that are run on one or more computing devices (e.g., as part of a distributed computation scheme). Two workers can be implemented by different computing devices or can be implemented as virtual machines on the same computing device.

The training computing system 150 can include a model trainer 160 that trains the machine-learned models 120 and/or 140 stored at the user computing device 102 and/or the server computing system 130 using various training or learning techniques, such as, for example, backwards propagation of errors. For example, a loss function can be back-propagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated back-propagation through time. The model trainer 160 can perform a number of generalization techniques (e.g., weight decays, dropouts, etc.) to improve the generalization capability of the models being trained.

In particular, the model trainer 160 can train the machine-learned models 120 and/or 140 based on a set of training data 162. The training data 162 can include, for example, example videos that have been labeled with ground truth classifications or labels.

In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 5A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 5B:
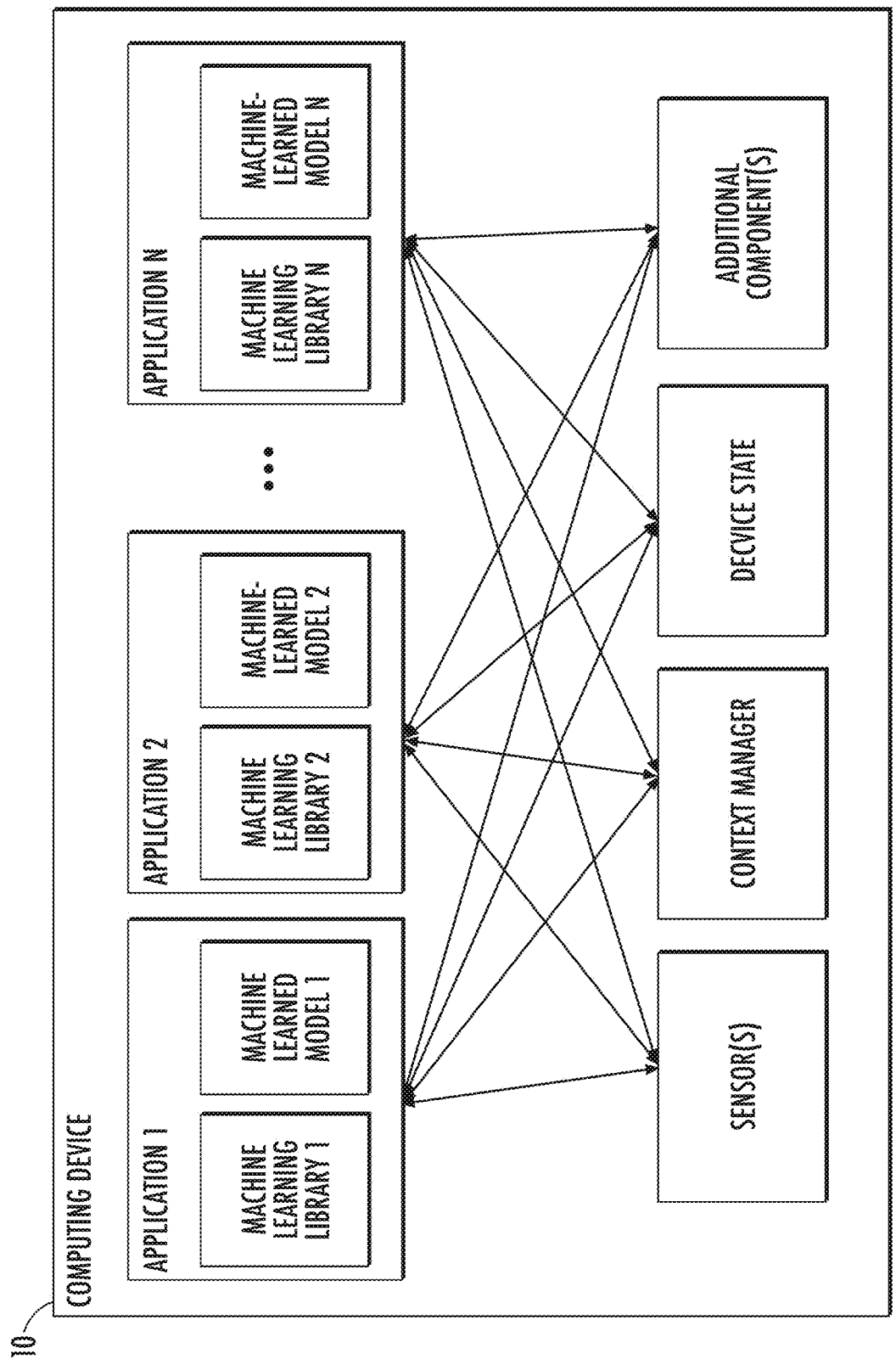
FIG. 5B depicts a block diagram of an example computing device according to example embodiments of the present disclosure.

FIG. 5B depicts a block diagram of an example computing device 10 that performs according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 5B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 5C:
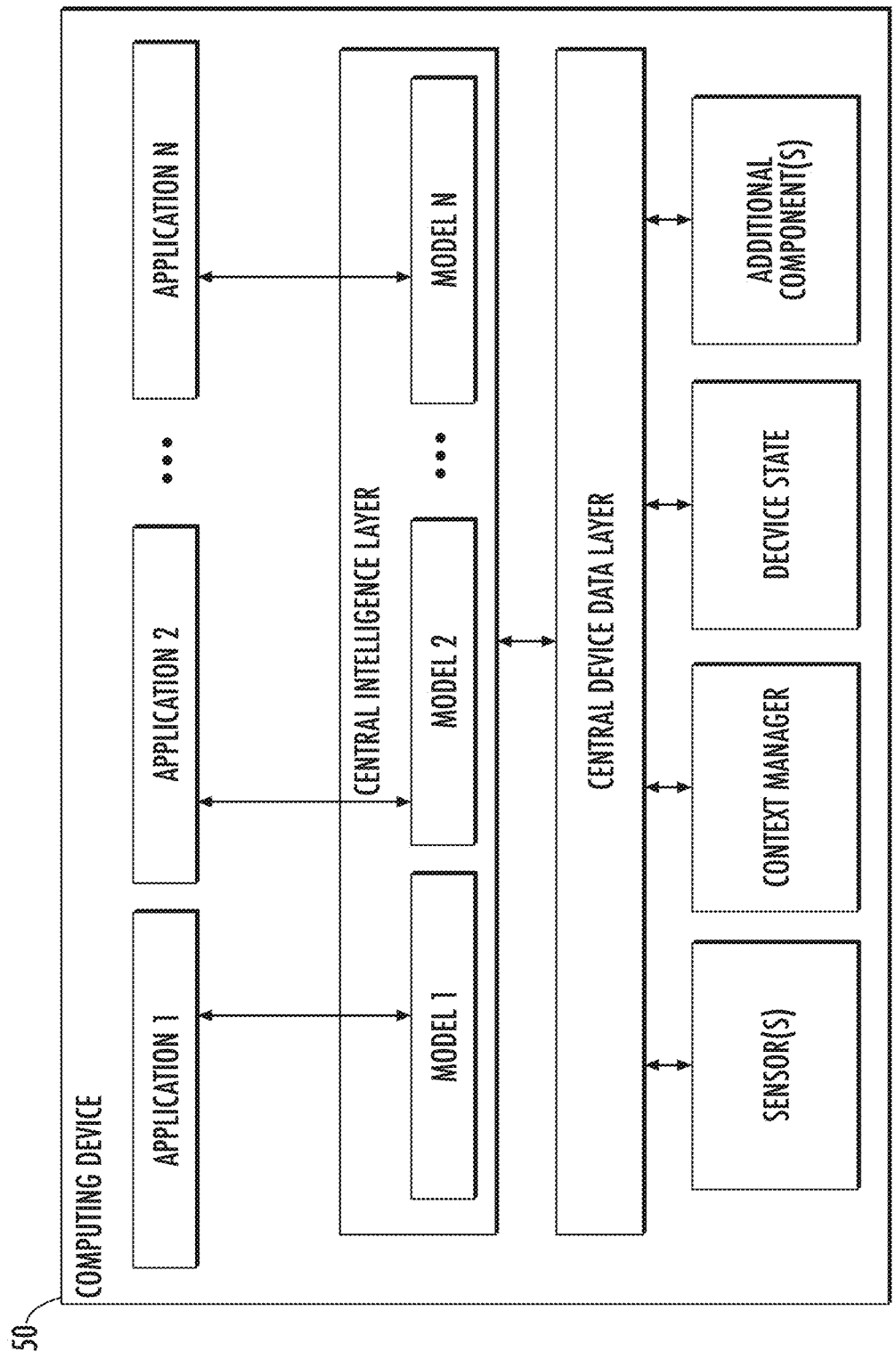
FIG. 5C depicts a block diagram of an example computing device according to example embodiments of the present disclosure.

FIG. 5C depicts a block diagram of an example computing device 50 that performs according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 5C, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 5C, the central device data layer can communicate with a number of other components of the computing device, such as, for example, one or more sensors, a context manager, a device state component, and/or additional components. In some implementations, the central device data layer can communicate with each device component using an API (e.g., a private API).

Example Methods

Figure 6:
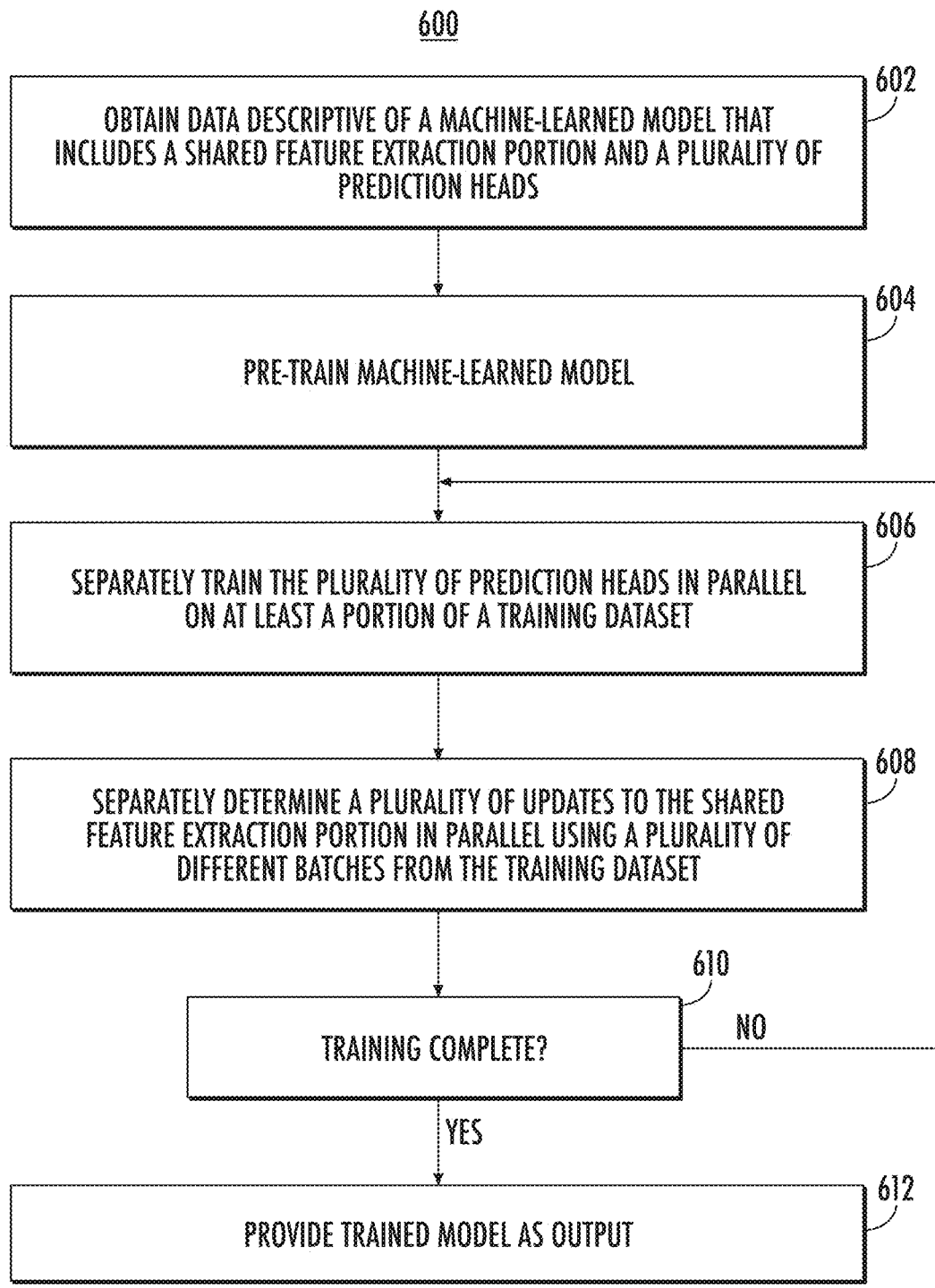
FIG. 6 depicts a flow chart diagram of an example method to train a machine-learned model according to example embodiments of the present disclosure.

FIG. 6 depicts a flow chart diagram of an example method to perform according to example embodiments of the present disclosure. Although FIG. 6 depicts steps performed in a particular order for purposes of illustration and discussion, the methods of the present disclosure are not limited to the particularly illustrated order or arrangement. The various steps of the method 600 can be omitted, rearranged, combined, and/or adapted in various ways without deviating from the scope of the present disclosure.

At 602, a computing system can obtain data descriptive of a machine-learned model that includes a shared feature extraction portion and a plurality of prediction heads. The shared feature extraction portion can be configured to receive and process a data input to produce an intermediate feature representation. The plurality of prediction heads can be configured to receive and process the intermediate feature representation to respectively produce a plurality of predictions.

In some implementations, the plurality of prediction heads include a plurality of classification heads. Each classification head can be configured to generate a separate classification for the data input based on the intermediate feature representation. In some implementations, the classification heads can be binary classification heads.

In some implementations, the data input includes an input video and the plurality of predictions include a plurality of classifications regarding content of the input video. Each of the plurality of training examples includes an example video labeled with a ground truth set of classes that describe content of the example video. In some implementations, each of a plurality of training examples includes an example video labeled with a ground truth set of classes that describe content of the example video.

In some implementations, the shared feature extraction portion includes a deep bag of frames aggregator that aggregates a plurality of video frames and the plurality of prediction heads include a plurality of classification experts. In some implementations, the deep bag of frames aggregator performs a self-weight average pooling operation that determines a normalized average of intermediate feature representations generated for the plurality of video frames over time.

At 604 the computing system can pre-train the machine-learned model. Pre-training the machine-learned model can include performing one or more warm start iterations in which the shared feature extraction portion of the machine-learned model is jointly trained with an alternative set of prediction heads. The alternative set of prediction heads can include a smaller number of heads than the plurality of prediction heads.

At 606, the computing system can separately train the plurality of prediction heads in parallel on at least a portion of the training dataset. In some implementations, separately training the plurality of prediction heads at 606 can include performing a first set of MapReduce operations. The first set of MapReduce can include mapping, by the computing system, the plurality of prediction heads of the machine-learned model to a first plurality of worker devices. The first set of MapReduce can include determining, by the first plurality of worker devices in parallel, a plurality of updates to the plurality of prediction heads based on at least a portion of the plurality of training examples. The first set of MapReduce can include reducing, by the computing system, the plurality of updates to the prediction heads back to the machine-learned model.

In some implementations, determining, by the first plurality of worker devices in parallel, the plurality of updates to the plurality of prediction heads based on at least the portion of the plurality of training examples can include respectively backpropagating, by the first plurality of worker devices in parallel, a loss function respectively through the plurality of prediction heads while keeping the shared feature extraction portion fixed.

At 608, the computing system can separately determine a plurality of updates to the shared feature extraction portion in parallel using a plurality of different batches from the training dataset. In some implementations, separately determining the plurality of updates at 608 can include performing a second set of MapReduce operations. The second set of MapReduce operations can include mapping, by the computing system, the plurality of different batches of the training examples to a second plurality of worker devices. The second set of MapReduce operations can include determining, by the second plurality of worker devices in parallel, a plurality of updates to the shared feature extraction portion respectively based on the plurality of different batches of the training examples. The second set of MapReduce operations can include reducing, by the computing system, the plurality updates to the shared feature extraction portion back to the machine-learned model.

In some implementations, each of the plurality of different batches of the training examples includes a unique combination of training examples relative to the other batches of the training examples. In some implementations, the plurality of different batches of the training examples include overlapping or non-overlapping batches of training examples.

In some implementations, determining, by the second plurality of worker devices in parallel, the plurality of updates to the shared feature extraction portion can include respectively determining, by the second plurality of worker devices in parallel, a plurality of gradient updates for the shared feature extraction portion respectively based on the plurality of different batches of the training examples. In some implementations, reducing, by the computing system, the plurality of updates to the feature extraction portions back to the machine-learned model can include aggregating, by the computing system, the plurality of gradient updates to determine a single gradient update and applying, by the computing system, the single gradient update to the shared feature extraction portion of the machine-learned model.

In some implementations, determining, by the second plurality of worker devices in parallel, the plurality of updates to the shared feature extraction portion can include performing, by the second plurality of worker devices, a distributed improved resilient backpropagation technique.

In some implementations, determining, by the second plurality of worker devices in parallel, the plurality of updates to the shared feature extraction portion respectively based on the plurality of different batches of the training examples can include respectively backpropagating, by the second plurality of worker devices in parallel, a loss function through a plurality of instances of the machine-learned model while keeping the plurality of prediction heads fixed.

At 610, the computing system can determine whether the training process has been completed. For example, iterations can be performed until one or more stopping criteria are met. The stopping criteria can be any number of different criteria including, as examples, a loop counter reaching a predefined maximum, an iteration over iteration change in parameter adjustments falling below a threshold, a gradient of the loss function being below a threshold value, and/or various other criteria.

If it is determined at 610 that training has not been completed, then method 600 can return to 606. In such fashion, blocks 606 and 608 can be iteratively and alternatingly performed.

However, if it is determined at 612 that training has been completed, then method 600 can proceed to 612 and provide the trained machine-learned model as an output. As examples, providing the model as an output can include storing the model (e.g., the values of the parameters of the model) in a memory device and/or transmitting the model to another computing device or system.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method to perform machine learning, the method comprising:
obtaining, by a computing system comprising one or more computing devices, data descriptive of a machine-learned model that comprises a shared feature extraction portion configured to receive and process a data input to produce an intermediate feature representation and a plurality of prediction heads that are configured to receive and process the intermediate feature representation to respectively produce a plurality of predictions;
performing, by the computing system, one or more training iterations to train the machine-learned model on a training dataset that comprises a plurality of training examples, wherein each training iteration comprises a first training stage and a second training stage;
wherein the first training stage comprises separately training the plurality of prediction heads in parallel on at least a portion of the training dataset;
wherein the first training stage comprises a first set of MapReduce operations, the first set of MapReduce operations comprising:
mapping, by the computing system, the plurality of prediction heads of the machine-learned model to a first plurality of worker devices;

determining, by the first plurality of worker devices in parallel, a plurality of updates to the plurality of prediction heads based on at least a portion of the plurality of training examples; and reducing, by the computing system, the plurality of updates to the prediction heads back to the machine-learned model;

wherein the second training stage comprises separately determining a plurality of updates to the shared feature extraction portion in parallel using a plurality of different batches from the training dataset; and wherein the second training stage comprises a second set of MapReduce operations, the second set of MapReduce operations comprising:

mapping, by the computing system, the plurality of different batches of the training examples to a second plurality of worker devices;

determining, by the second plurality of worker devices in parallel, a plurality of updates to the shared feature extraction portion respectively based on the plurality of different batches of the training examples; and reducing, by the computing system, the plurality updates to the shared feature extraction portion back to the machine-learned model.

2. The computer-implemented method of claim 1, wherein each of the plurality of different batches of the training examples comprises a unique combination of training examples relative to the other batches of the training examples.

3. The computer-implemented method of claim 1, wherein the plurality of different batches of the training examples comprise non-overlapping batches of training examples.

4. The computer-implemented method of claim 1, wherein performing, by the computing system, the one or more training iterations comprises performing, by the computing system and for a plurality of training iterations, the first training stage and the second training stage in an alternating fashion.

5. The computer-implemented method of claim 1, wherein the plurality of prediction heads comprise a plurality of classification heads, each classification head configured to generate a separate classification for the data input based on the intermediate feature representation.

6. The computer-implemented method of claim 1, wherein the data input comprises an input video and the plurality of predictions comprise a plurality of classifications regarding content of the input video, and wherein each of the plurality of training examples comprises an example video labeled with a ground truth set of classes that describe content of the example video.

7. The computer-implemented method of claim 6, wherein:

the shared feature extraction portion comprises a deep bag of frames aggregator that aggregates a plurality of video frames; and the plurality of prediction heads comprises a plurality of classification experts.

8. The computer-implemented method of claim 7, wherein the deep bag of frames aggregator performs a self-weight average pooling operation that determines a normalized average of intermediate feature representations generated for the plurality of video frames over time.

9. The computer-implemented method of claim 1, wherein:

determining, by the second plurality of worker devices in parallel, the plurality of updates to the shared feature extraction portion comprises respectively determining, by the second plurality of worker devices in parallel, a plurality of gradient updates for the shared feature extraction portion respectively based on the plurality of different batches of the training examples; and reducing, by the computing system, the plurality of updates to the feature extraction portions back to the machine-learned model comprises:

aggregating, by the computing system, the plurality of gradient updates to determine a single gradient update; and applying, by the computing system, the single gradient update to the shared feature extraction portion of the machine-learned model.

10. The computer-implemented method of claim 1, wherein determining, by the second plurality of worker devices in parallel, the plurality of updates to the shared feature extraction portion comprises performing, by the second plurality of worker devices, a distributed improved resilient backpropagation technique.

11. The computer-implemented method of claim 1, wherein determining, by the first plurality of worker devices in parallel, the plurality of updates to the plurality of prediction heads based on at least the portion of the plurality of training examples comprises respectively backpropagating, by the first plurality of worker devices in parallel, a loss function respectively through the plurality of prediction heads while keeping the shared feature extraction portion fixed.

12. The computer-implemented method of claim 1, wherein determining, by the second plurality of worker devices in parallel, the plurality of updates to the shared feature extraction portion respectively based on the plurality of different batches of the training examples comprises respectively backpropagating, by the second plurality of worker devices in parallel, a loss function through a plurality of instances of the machine-learned model while keeping the plurality of prediction heads fixed.

13. The computer-implemented method of claim 1, further comprising:

prior to performing, by the computing system, the one or more training iterations, performing, by the computing system, one or more warm start iterations in which the shared feature extraction portion of the machine-learned model is jointly trained with an alternative set of prediction heads;

wherein the alternative set of prediction heads comprises a smaller number of heads than the plurality of prediction heads.

14. The computer-implemented method of claim 1, wherein each of the first plurality of workers determines a respective update to a single respective one of the plurality of prediction heads.

15. A computing system comprising:

one or more processors;

one or more non-transitory computer-readable media that collectively store:

a machine-learned video annotation model that comprises a feature extraction portion configured to receive and process one or more video frames of an input video to generate an intermediate feature representation and a plurality of classification heads configured to receive and process the intermediate feature representation to generate a plurality of classifications for the one or more video frames relative to a plurality of classes, wherein one or both of the feature extraction portion and the plurality of classification heads has been trained using one or more MapReduce operations; and instructions that, when executed by the one or more processors, cause the computing system to perform operations, the operations comprising:

providing the one or more video frames of the input video as an input the machine-learned video annotation model; and receiving the plurality of classifications for the one or more video frames as an output of the machine-learned video annotation model;

wherein the machine-learned video annotation model has been trained via a training process comprising one or more training iterations, each of the one or more training iterations comprising a first training stage and a second training stage;

wherein the first training stage comprises separately training the plurality of classification heads in parallel; and wherein the second training stage comprises separately determining a plurality of updates to the feature extraction portion in parallel using a plurality of different batches from the training dataset.

16. The computing system of claim 15, wherein the feature extraction portion comprises a deep bag of frames aggregator that aggregates a plurality of video frames.

17. The computing system of claim 16, wherein the deep bag of frames aggregator performs a self-weight average pooling operation that determines a normalized average of intermediate feature representations generated for the plurality of video frames over time.

18. A computer-implemented method to perform machine learning, the method comprising:

obtaining, by a computing system comprising one or more computing devices, data descriptive of a machine-learned model that comprises a shared feature extraction portion configured to receive and process a data input to produce an intermediate feature representation and a plurality of prediction heads that are configured to receive and process the intermediate feature representation to respectively produce a plurality of predictions;

performing, by the computing system, one or more warm start iterations in which the shared feature extraction portion of the machine-learned model is jointly trained with an alternative set of prediction heads, wherein the alternative set of prediction heads comprises a smaller number of heads than the plurality of prediction heads; and after performing the one or more warm start iterations, performing, by the computing system, one or more training iterations to train the machine-learned model on a training dataset that comprises a plurality of training examples, wherein each training iteration comprises a first training stage and a second training stage;

wherein the first training stage comprises separately training the plurality of prediction heads in parallel on at least a portion of the training dataset; and wherein the second training stage comprises separately determining a plurality of updates to the shared feature extraction portion in parallel using a plurality of different batches from the training dataset.

* * * * *